(12) United States Patent
Hemena et al.

(10) Patent No.: US 6,188,588 B1
(45) Date of Patent: Feb. 13, 2001

(54) SWITCHING CONTROLLER AND METHOD FOR OPERATING A FLYBACK CONVERTER IN A CRITICALLY CONTINUOUS CONDUCTION MODE

(75) Inventors: William Hemena, Raleigh; Randhir S. Malik, Cary, both of NC (US)

(73) Assignee: International Business Machine Corporation, Armonk, NY (US)

( * ) Notice: Under 35 U.S.C. 154(b), the term of this patent shall be extended for 0 days.

(21) Appl. No.: 09/414,752

(22) Filed: Oct. 7, 1999

(51) Int. Cl.$^7$ ............................ H02M 3/335; H02M 1/12; H02M 1/14
(52) U.S. Cl. .................................. 363/21; 363/41; 363/97
(58) Field of Search .............................. 363/21, 41, 40, 363/16, 20, 95, 97, 131; 323/266

(56) References Cited

U.S. PATENT DOCUMENTS

| | | | |
|---|---|---|---|
| 4,688,158 | 8/1987 | Peterson et al. | 361/21 |
| 5,170,333 | 12/1992 | Niwayama | 363/21 |
| 5,325,282 | 6/1994 | Bansard | 363/21 |
| 5,570,278 | 10/1996 | Cross | 363/20 |
| 5,602,724 | 2/1997 | Balakrishnan | 363/21 |
| 5,734,564 | 3/1998 | Brkovic | 363/21 |
| 5,757,626 | * 5/1998 | Jovanovic et al. | 363/21 |
| 5,796,595 | 8/1998 | Cross | 363/16 |
| 5,862,044 | 1/1999 | Shioya et al. | 363/21 |
| 5,867,379 | * 2/1999 | Maksimovic | 363/89 |
| 5,920,471 | * 7/1999 | Rajagopalan et al. | 363/89 |
| 5,991,171 | * 11/1999 | Cheng | 363/21 |
| 5,991,172 | * 11/1999 | Jovanovic et al. | 363/21 |
| 6,011,706 | * 1/2000 | Adragna et al. | 363/41 |

* cited by examiner

Primary Examiner—Peter S. Wong
Assistant Examiner—Bao Q. Vu
(74) Attorney, Agent, or Firm—J. Bruce Schelkopf; Andrew Dillon

(57) ABSTRACT

A switching controller for use in a power converter having a controllable switch and operable in a critically continuous conduction mode (CCCM). The switching controller includes an error amplifier that senses an electrical characteristic of the power converter and compares the electrical characteristic to a reference electrical characteristic to generate an error signal. Next, the error signal is provided to a drive signal generator, which is coupled to the controllable switch, that compares the error signal to a reference waveform and provides, in response thereto, a drive signal to the controllable switch. A waveform shaping circuit modifies the reference waveform by comparing a sensed voltage across the controllable switch to an input voltage and provides, in response to the sensed voltage being lower than the input voltage, a modifying signal to the drive signal generator. The modifying signal modifies the reference waveform which also causes the drive signal generator to turn-on the controllable switch. In this manner, a continuous conduction mode (CCM) operation is achieved to provide a highly efficient, high power factor power converter.

18 Claims, 2 Drawing Sheets ly to power conversion and in particular to power supplies. Still more particularly, the present invention relates to a switching controller for operating a flyback power converter in a critically continuous conduction mode to achieve high power factor and a method of operation thereof.

SWITCHING CONTROLLER AND METHOD FOR OPERATING A FLYBACK CONVERTER IN A CRITICALLY CONTINUOUS CONDUCTION MODE

BACKGROUND OF THE INVENTION

1. Field of the Invention

The present invention relates generally to power conversion and in particular to power supplies. Still more particularly, the present invention relates to a switching controller for operating a flyback power converter in a critically continuous conduction mode to achieve high power factor and a method of operation thereof.

2. Description of the Related Art

Regulated DC power supplies are employed in various analog and digital electronic systems. The power supplies are typically designed to produce a regulated output, i.e., the output voltage is maintained within a specific range, with electrical isolation between the input and output. Additionally, power supplies may be designed to provide multiple outputs, e.g., positive and negative, that differ in voltage and current ratings. Two conventional topologies utilized in DC power supplies are a linear design topology and a switching design topology.

In the linear design topology, a low-frequency, e.g., 60 Hertz, transformer is used to provide electrical isolation between the input and output of the power supply with a transistor acting as an adjustable resistor. While the linear power supply employs a simple design and introduces a moderate electromagnetic interference (EMI) with other equipment employed therewith, the topology endures several limitations. First, low-frequency transformers are relatively large and, as a result, the dimensions of the linear power supply are constrained to accommodate a large low-frequency transformer. Due to the size limitations, the linear power supply is not preferable, especially in environments where the components are being downsized. Additionally, the transistor, acting as an adjustable resistor, operates within its active region, thereby resulting in a significant amount of power loss. Typically, the overall efficiencies of the linear power supplies are between 30% to 60%.

In contrast to the linear power supplies, the transformation of the DC voltage in switching power supplies is accomplished using DC/DC converters. The DC/DC converters usually employ solid-state devices, e.g., transistors, as switching devices that are completely on or completely off. Since the devices do not operate in the active region, power dissipation therethrough is significantly reduced, resulting in a higher efficiency converter; typically 70% to 90% efficient. Additionally, since switching power supplies employ a high frequency isolation transformer, the size and weight of the switching power supplies may be significantly reduced.

A switching, or switch-mode, power converter generally includes an inductor, or transformer, coupled to an input power source and a switching transistor. When the switching transistor is turned on, energy is supplied to the inductor or transformer from the input power source. When the switching transistor is off, the output stage, comprising a rectifying diode and an output capacitor, receives energy from the inductor and the input voltage source. The operation of the switching transistor is controlled such that the converter output is well-regulated.

Current approaches to providing an efficient, high power factor power converter with an isolated low DC output voltage includes using a buck-boost converter and its relatives (flyback, Cuk and SEPIC) that are known to draw theoretically perfect sine wave current when the converters are operated in a discontinuous conduction mode (DCM). In cost-sensitive applications, however, the above mentioned power converters are less attractive than a boost converter due to the poorer exploitation of the power switch and/or the additional inductor and capacitor. To produce an isolated low output voltage, a boost converter generally employs a nonisolated Boost stage that generates an intermediate high voltage level, e.g., 400 VDC. A second "chopper" stage then converts this intermediate voltage to the required low output level. The use of two power stages, i.e., boost and chopper stages, however, also increases the cost and lowers the overall efficiency of the power converter.

Accordingly, what is needed in the art is an improved power converter with an isolated low voltage output that mitigates the above mentioned limitations. In particular, there is a need in the art for a more efficient, high power factor flyback power converter that is operable in a critically continuous conduction mode.

SUMMARY OF THE INVENTION

It is an therefore an object of the present invention to provide an improved and more efficient flyback converter.

It is another object of the present invention to provide a switching controller and method for operating a flyback converter in a critically continuous conduction mode.

To achieve the foregoing objects, and in accordance with the invention as embodied and broadly described herein, a switching controller for use in a power converter having a controllable switch and operable in a critically continuous conduction mode (CCCM) is disclosed. The switching controller includes an error amplifier that senses an electrical characteristic of the power converter and compares the electrical characteristic to a reference electrical characteristic to generate an error signal. Next, the error signal is provided to a drive signal generator, which is coupled to the controllable switch, that compares the error signal to a reference waveform and provides, in response thereto, a drive signal to the controllable switch. A waveform shaping circuit modifies the reference waveform by comparing a sensed voltage across the controllable switch to an input voltage and provides, in response to the sensed voltage being lower than the input voltage, a modifying signal to the drive signal generator. The modifying signal modifies the reference waveform which also causes the drive signal generator to turn-on the controllable switch.

The present invention discloses a novel control circuit for controlling the operation of a switch in a switching power converter utilizing a voltage characteristic, e.g., drain voltage, of the switch as a turn-on condition. The control scheme employed by the present invention is such that the switching device turns on, i.e., conducts, at a time when the energy stored in the magnetizing inductance of a power transformer has been delivered to a load and the drain voltage of the switching device is at its minimum. These conditions allow for zero-current-switching (ZCS), thereby eliminating, or substantially reducing, switching losses. Additionally, a controlled delay in turning on the switching device will also force the magnetizing inductance of the power transformer to "ring" with the switching device's interelectrode capacitance, thus allowing the switch to be turned on at a voltage that is lower than the input voltage, thereby reducing the switching losses due to the interelectrode capacitance. Furthermore, by waveshaping the input line current, a high power factor approaching unity is also realized.

In one embodiment of the present invention, the waveform shaping circuit includes an operational amplifier (op-amp), exclusive OR gate and a second controllable switch. The op-amp is configured as a comparator, wherein the voltage sensed across the controllable switch and the input voltage are coupled to an inverting node and a noninverting node, respectively, of the op-amp. The gate inputs of the exclusive OR gate are coupled to an output of the op-amp and to the drive signal generated by the drive signal generator. The output of the exclusive OR gate, in turn, controls the operation of the second controllable switch. In a related embodiment, the second controllable switch is a bipolar junction transistor (BJT). It should be noted that the second controllable switch need not necessarily be limited to a switching transistor, other switching devices may also be advantageously utilized.

In another embodiment of the present invention, the electrical characteristic measured and referenced is voltage. Thus, the measured electrical characteristic is a output voltage of the power converter and the referenced electrical characteristic is a voltage reference source.

In yet another embodiment of the present invention, the controllable switch is a power transistor, such as a metal-oxide-semiconductor field effect transistor (MOSFET). Alternatively, in another advantageous embodiment, the power transistor employed may be an insulated gate bipolar transistor (IGBT) or a gate turn-off thyristor (GTO).

In another embodiment of the present invention, the drive signal generator comprises an operational amplifier (op-amp) configured as a comparator. In a related embodiment of the present invention, the drive signal generated by the drive signal generator to control the operation of the controllable switch is a pulse width modulated (PWM) signal.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
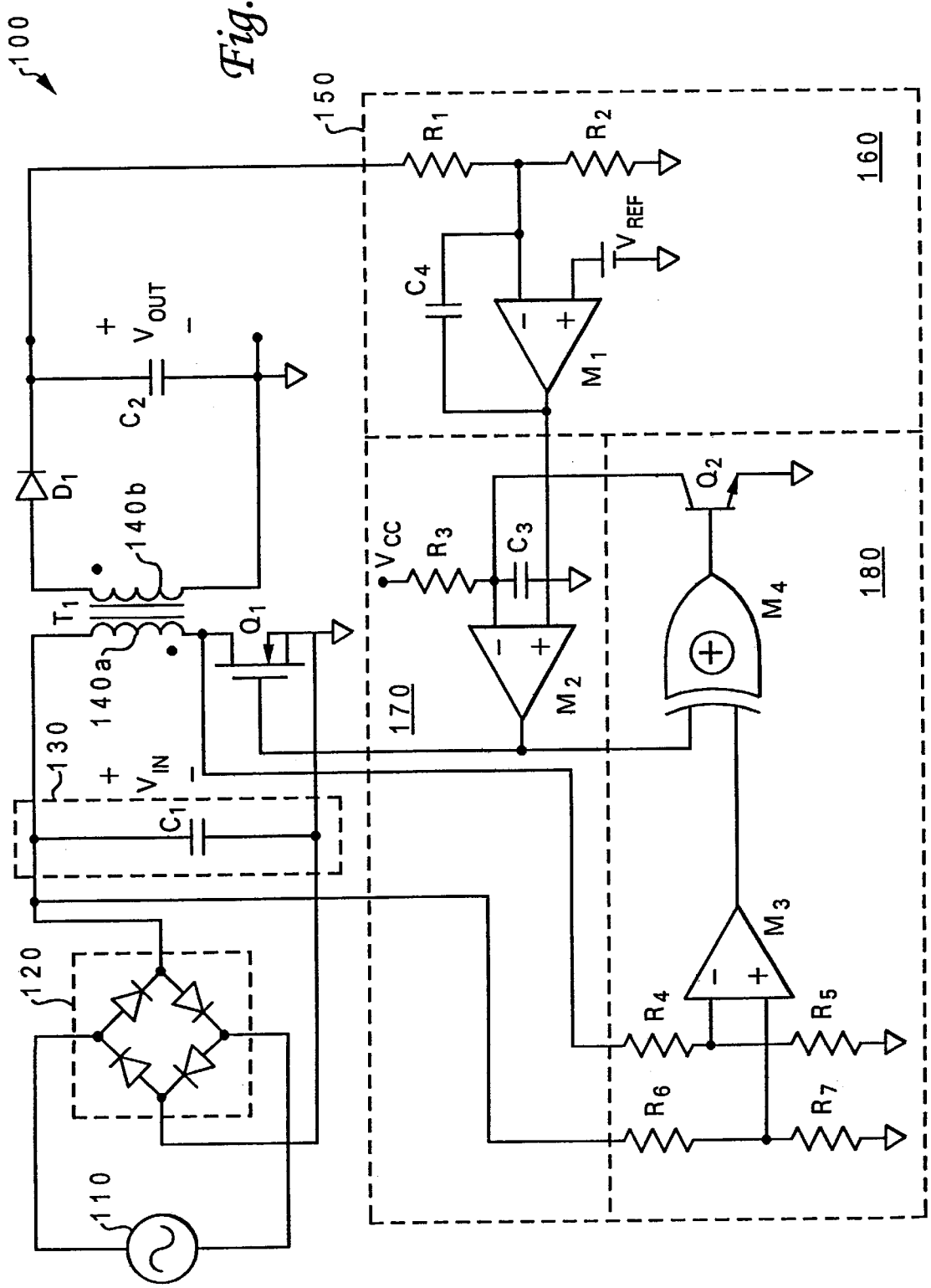
FIG. 1 illustrates a schematic diagram of an exemplary flyback power converter utilizing an embodiment of a switching controller constructed according to the principles disclosed by the present invention.

With reference now to the figures, and in particular, with reference to FIG. 1, there is depicted a schematic diagram of an exemplary flyback power converter 100 utilizing an embodiment of a switching controller 150 constructed according to the principles disclosed by the present invention. The flyback converter 100 receives AC input power from a voltage source 110, e.g., a commercial power source, via a rectifier 120 that includes a plurality of diodes (shown but not referenced) arranged in a full bridge configuration. Those skilled in the art should readily appreciate that, in other advantageous embodiments, controllable switches may be used in place of the diodes in rectifier 120. Rectifier 120 rectifies the AC input voltage into a DC voltage Vin for application across an electromagnetic interference (EMI) filter 130. In the illustrated embodiment, a capacitor C1 is employed as EMI filter 130 to decouple the high frequency noise generated by converter 100.

Flyback converter 100 also includes a power transformer T1 having primary and secondary windings 140a, 140b, respectively. A controllable switch Q1 is coupled to primary winding 140a and, in an advantageous embodiment, is a metal-oxide-semiconductor field effect transistor (MOSFET). In another embodiment, other switching devices, such as an insulated gate bipolar transistor (IGBT) or a gate turn-off thyristor (GTO), may also be advantageously employed. The output stage of flyback converter 100 includes an output diode D1 that is coupled to secondary winding 140b and an output capacitor C2, such as an electrolytic capacitor, that is used to store energy and filter an output voltage Vout waveform of the converter.

The operation of switch Q1 is controlled utilizing switching controller 150 that includes an error amplifier 160, a drive signal generator 170 and a waveform shaping circuit 180. Error amplifier 160 comprises a first voltage divider network of first and second resistors R1, R2, that is coupled across output capacitor C2 to sense output voltage Vout. Error amplifier 160 also includes a first operational amplifier (op-amp) M1 whose inverting input is coupled to the voltage divider network. A voltage reference Vref is coupled to first op-amp's M1 noninverting input to provide a comparison voltage to output voltage Vout. A feedback capacitor C4 is coupled at first op-amp M1 output node to its inverting input to complete the error amplifier's 160 circuit configuration. Error amplifier 160 sets a control voltage at the output node of first op-amp M1, which is a function of the line and load voltages, that determines the conduction period, i.e., on time, of controllable switch Q1. It should be readily apparent to those skilled in the art that the function of error amplifier 160 is similar to those error amplifiers employed for controlling an output voltage in conventional power supplies.

Drive signal generator 170 includes a second op-amp M2 that is also configured as a comparator with its noninverting input coupled to the output node of first op-amp M1. Drive signal generator 170 also includes a third resistor R3 and a timing capacitor C3, series-coupled between a supply voltage Vcc and ground, that provides a reference waveform, i.e., a high frequency ramp clipped at supply voltage Vcc, to the inverting input of second op-amp M2. Second op-amp M2 generates a drive signal to controllable switch Q1 that is coupled to the output of the second op-amp M2.

Waveform shaping circuit 180 comprises a third op-amp M3 whose output is provided, along with the output of second op-amp M2, i.e., drive signal, to the input of an exclusive OR gate M4. The inverting and noninverting inputs of third op-amp M3 are coupled to a second voltage divider network (fourth and fifth resistors R4, R5) and a third voltage divider network (sixth and seventh resistors R6, R7) that sense the voltage across controllable switch Q1, i.e., drain voltage, and input voltage Vin, respectively. The output of gate M4 is provided as a drive signal to a second controllable switch Q2. It should be noted that since second controllable switch Q2 is not subjected to high voltage or current levels, in an advantageous embodiment, the switching device employed may be a bipolar junction transistor (BJT). It should also be readily apparent to those skilled in the art that second controllable switch Q2 is not limited to any particular type of switching device and that any switching device may be advantageously employed. The operation of converter 100 will hereinafter be described in greater detail with reference to FIG. 2, with continuing reference to FIG. 1.

Figure 2:
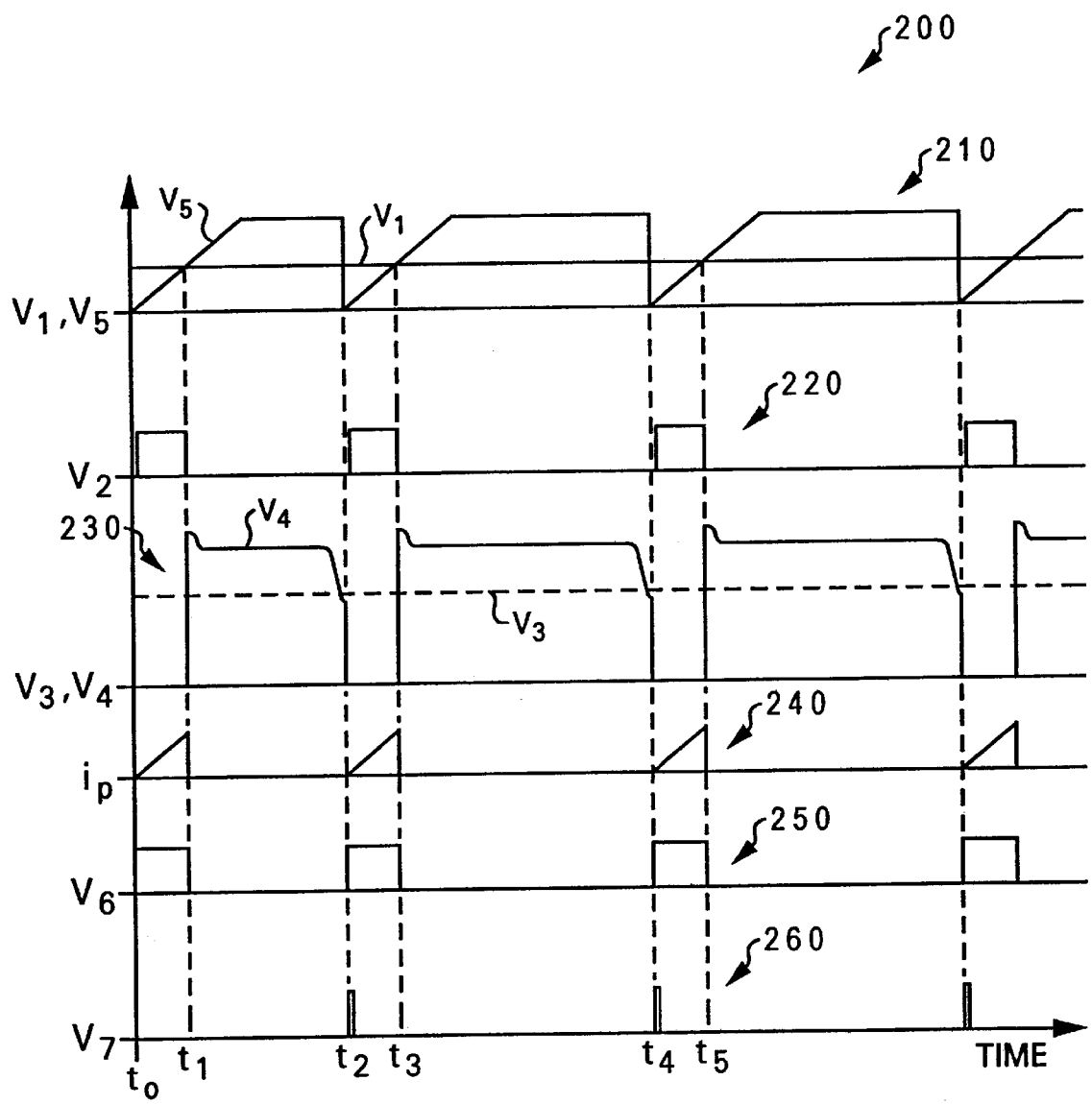
FIG. 2 illustrates exemplary drive signals, current and voltage waveforms of the power converter depicted in FIG. 1.

Referring now to FIG. 2, there are illustrated exemplary drive signals, current and voltage waveforms 200 of converter 100 depicted in FIG. 1. Waveforms 200 includes first waveform 210 that depicts voltages V1 and V5 at the noninverting and inverting inputs of second op-amp M2, respectively. A second waveform 220 corresponds to the drive signal generated at the output of second op-amp M2 that is used to control the operation of controllable switch Q1. A third waveform 230 illustrates the voltages V3 and V4 that correspond to input voltage Vin and the voltage across controllable switch Q1, respectively. A fourth waveform 240 corresponds to the primary current ip in primary winding 140a of power transformer T1. Fifth and sixth waveforms 250, 260 correspond to the voltages V6 and V7 that are the output of third op-amp M3 and gate M4, respectively.

The following assumptions and initial conditions apply in describing the operation of converter 100 over an exemplary switching cycle: power transformer T1 is fully discharged and second controllable switch is off, i.e., non-conducting. It should be noted, however, that the assumptions and conditions are not necessary to the operation of converter 100.

At time t0, with the voltage across controllable switch Q1 lower than input voltage Vin, the output of third op-amp M3 is driven high (logic high) that, in turn, drives the output of gate M4 high. Second controllable switch Q2 is turned on, i.e., conducting, discharging timing capacitor C3 and driving the output, i.e., drive signal V2, of second op-amp M2 high, turning on controllable switch Q1. When controllable switch Q1 turns on, the rectified input voltage Vin is applied to power transformer T1 and energy is stored in the magnetizing inductance of power transformer T1. Concurrently, the voltage across timing capacitor C3 begins to increase, as illustrated by V5 of first waveform 210.

At time t1, the charge (V5) across timing capacitor C3 begins to exceed the control voltage (V1) that is the output from error amplifier 160. With V5 greater than control voltage V1, the output of second op-amp M2 goes low, turning off controllable switch Q1. As controllable switch Q1 turns off, the voltage across controllable switch Q1, i.e., V4, goes high and exceeds input voltage Vin, as illustrated by third waveform 230. This in turn will force the output of the third op-amp M3 low. Exclusive OR-ing of the drive signal (V2) and the output of third op-amp M3 (V6) maintains the output of gate M4 low; keeping controllable switch Q1 off and continuing charging timing capacitor C3. Furthermore, when controllable switch Q1 turns off, the voltage across secondary windings 140b of power transformer T1 reverses, forward-biasing output diode D1 to begin delivering power to a load (not shown). During this period output capacitor C2 continues being charged. Output voltage Vout is kept constant by switching controller 150 by comparing output voltage Vout with fixed voltage reference Vref. It should be noted that to achieve high power factor, it is necessary that the output of error amplifier 160 is kept constant over an AC line cycle period. At the instant when the energy stored in the magnetizing inductance of power transformer T1 is completely discharged, voltage V4 across controllable switch Q1 will begin to decay due to the ringing created by the primary magnetizing inductance of power transformer T1 and the capacitance of controllable switch Q1.

At time t2, voltage V4 across controllable switch Q1 has been reduced to a value below input voltage Vin, causing the output of third op-amp M3 to go high. With second and third op-amps M2, M3 outputs low and high, respectively, gate's M4 output goes high turning on second controllable switch Q2. Second controllable switch Q2, in turn, discharges the energy stored in timing capacitor C3. At this instant, the output of second op-amp M2 goes high causing the output of gate M4 to go low, turning off second controllable switch Q2.

The cycle described above is then repeated after a short time delay, introduced by the operation of gate M4, when controllable switch Q1 is turned on again. The controlled delay in turning on controllable switch Q1 will also force the magnetizing inductance of power transformer T1 to "ring" with controllable switch's Q1 interelectrode capacitance, thus allowing controllable switch Q1 to be turned on at a voltage that is lower than input voltage Vin. This, in turn, will reduce the switching losses due to the interelectrode capacitance of controllable switch Q1.

It should be noted that the turning on of controllable switch Q1 occurs when the voltage across controllable switch Q1 is lower than the rectified AC input voltage, thus, minimizing switching losses due to the parasitic capacitances present in the switching transistor. Furthermore, since the switching is not a forced turn on, the noise generated by turning on and off controllable switch Q1 will also be minimized. Consequently, the root-mean-square (rms) currents through power transformer T1, output diode D1, output capacitor C2 and controllable switch Q1 will be lower, when compared to a power converter operating in discontinuous conduction mode (DCM), minimizing the steady state losses in power converter 100.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A switching controller for use in a power converter having a controllable switch and operable in a critically continuous conduction mode (CCCM), said switching controller comprising:

an error amplifier for sensing an electrical characteristic of said power converter and comparing said electrical characteristic to a reference electrical characteristic to generate an error signal;

a drive signal generator, coupled to said controllable switch, for comparing said error signal to a reference waveform and providing, in response thereto, a drive signal to said controllable switch; and a waveform shaping circuit, coupled to said power converter, for comparing a sensed voltage across said controllable switch to a sensed time-varying input voltage and providing, in response to said sensed voltage being lower than said input voltage, a modifying signal to said drive signal generator, said modifying signal modifying said reference waveform and causing said drive signal generator to turn-on said controllable switch, said waveform shaping circuit including:

an operational amplifier configured as an comparator, wherein said sensed voltage and said input voltage are coupled to an inverting node and a noninverting node, respectively, of said operational amplifier;

an exclusive OR gate, said gate inputs are coupled to an output of said operational amplifier and to said drive signal of said drive signal generator; and a second controllable switch coupled to an output of said gate.

2. The switching controller as recited in claim 1 wherein said electrical characteristic is an output voltage of said power converter.

3. The switching controller as recited in claim 1 wherein said controllable switch is a metal-oxide-semiconductor field effect transistor (MOSFET).

4. The switching controller as recited in claim 1 wherein said drive signal generator comprises an operational amplifier (op-amp) configured as a comparator.

5. The switching controller as recited in claim 1 wherein said drive signal is a pulse width modulated (PWM) signal.

6. The switching controller as recited in claim 1 wherein said second controllable switch is a bipolar junction transistor (BJT).

7. A method of operating a power converter having a controllable switch in a critically continuous conduction mode (CCCM), comprising the steps of:

generating an error signal that is a result of comparing an electrical characteristic of said power converter to a reference electrical characteristic;

comparing said error signal to a reference waveform and providing, in response thereto, a drive signal to said controllable switch; and sensing a voltage across said controllable switch and comparing said sensed voltage to a sensed time-varying input voltage; and modifying said reference waveform utilizing a waveform shaping circuit and turning-on said controllable switch in response to said sensed voltage being lower than said input voltage.

8. The method as recited in claim 7 wherein said step of generating an error signal includes the step of sensing an output voltage of said power converter.

9. The method as recited in claim 7 wherein said providing a drive signal includes generating a pulse width modulated signal.

10. The method as recited in claim 7 wherein said step of comparing said error signal to said reference waveform includes the step of configuring an operational amplifier as a comparator.

11. The method as recited in claim 7 wherein said step of modifying said reference waveform includes the step of turning-on a second controllable switch.

12. A flyback power converter, comprising:

a power transformer having primary and secondary windings;

a controllable switch coupled to said primary windings;

a power diode coupled to said secondary windings;

an output capacitor coupled to said power diode; and a switching controller, including:

an error amplifier for sensing an electrical characteristic of an output of said flyback power converter and comparing said electrical characteristic to a reference electrical characteristic to generate an error signal;

a drive signal generator, coupled to said controllable switch, for comparing said error signal to a reference waveform and providing, in response thereto, a drive signal to said controllable switch; and a waveform shaping circuit, coupled to said flyback power converter, for comparing a sensed voltage across said controllable switch to a sensed time-varying input voltage and providing, in response to said sensed voltage being lower than said input voltage, a modifying signal to said drive signal generator, said modifying signal modifying said reference waveform and causing said drive signal generator to turn-on said controllable switch, said waveform shaping circuit including:

an operational amplifier configured as an comparator, wherein said sensed voltage and said input voltage are coupled to an inverting node and a noninverting node, respectively, of said operational amplifier;

an exclusive OR gate, said gate inputs are coupled to an output of said operational amplifier and to said drive signal of said drive signal generator; and a second controllable switch coupled to an output of said gate.

13. The flyback power converter as recited in claim 12 further comprising an electromagnetic interference (EMI) filter.

14. The flyback power converter as recited in claim 13 wherein said EMI filter is a capacitor.

15. The flyback power converter as recited in claim 12 further comprising a rectifier.

16. The flyback power converter as recited in claim 12 wherein said electrical characteristic is an output voltage of said flyback power converter.

17. The flyback power converter as recited in claim 12 wherein said controllable switch is a metal-oxide-semiconductor field effect transistor (MOSFET).

18. The flyback power converter as recited in claim 12 wherein said drive signal is a pulse width modulated (PWM) signal.

\* \* \* \* \*